United States Patent
Bornheim et al.

(10) Patent No.: US 6,655,289 B1
(45) Date of Patent: Dec. 2, 2003

(54) TWO-PIECE CAPSULE TRIGGER UNIT FOR INITIATING PYROTECHNIC ELEMENTS

(75) Inventors: Wilhelm Bornheim, Troisdorf (DE); Friedrich Heinemeyer, Siegburg (DE); Jan Petzold, Rösrath (DE); Heinz Schäfer, Lilienthal (DE); Jürgen Zimmermann, Troisdorf (DE)

(73) Assignee: Orica Explosives Technology PTY Limited, Melbourne (AU)

(*) Notice: Subject to any disclaimer, the term of this patent is extended or adjusted under 35 U.S.C. 154(b) by 0 days.

(21) Appl. No.: 09/869,893

(22) PCT Filed: Dec. 17, 1999

(86) PCT No.: PCT/EP99/10043

§ 371 (c)(1), (2), (4) Date: Nov. 27, 2001

(87) PCT Pub. No.: WO00/40920

PCT Pub. Date: Jul. 13, 2000

(30) Foreign Application Priority Data

Jan. 8, 1999 (DE) .......... 199 00 391
Sep. 22, 1999 (DE) .......... 199 45 303

(51) Int. Cl.[7] ............... F42B 3/11
(52) U.S. Cl. ............... 102/202.12; 102/202.9; 102/202.11; 102/202.14; 102/275.12
(58) Field of Search .......... 102/202.9, 202.11, 102/202.12, 202.14, 275.12

(56) References Cited

U.S. PATENT DOCUMENTS

| | | | | |
|---|---|---|---|---|
| 3,101,669 A | * | 8/1963 | Gatley et al. | 102/202.9 |
| 3,352,237 A | * | 11/1967 | Turquois | 102/202.11 |
| 4,331,079 A | * | 5/1982 | Bajohr et al. | 102/202.12 |
| 4,369,707 A | * | 1/1983 | Budde | 102/202.2 |
| 4,640,035 A | * | 2/1987 | Kind et al. | 149/123 |
| 4,648,319 A | * | 3/1987 | Westerlund et al. | 102/202.12 |
| 4,951,570 A | * | 8/1990 | La Mura et al. | 102/202.11 |
| 5,444,208 A | * | 8/1995 | Mortensen | 102/202.9 |
| 5,955,699 A | * | 9/1999 | Perotto et al. | 102/530 |

FOREIGN PATENT DOCUMENTS

| | | | | |
|---|---|---|---|---|
| DE | 1072527 | * | 12/1959 | 102/202.11 |
| DE | 1095725 | * | 12/1960 | 102/202.11 |
| DE | 1143136 | * | 1/1963 | 102/202.11 |
| SU | 157251 | * | 1/1963 | 102/202.11 |

OTHER PUBLICATIONS

European Search Report for PCT application No. Ep99/10043 published May 19, 2000.*

* cited by examiner

*Primary Examiner*—Peter A. Nelson
(74) *Attorney, Agent, or Firm*—Antonelli, Terry, Stout & Kraus, LLP

(57) ABSTRACT

The invention relates to trigger units for initiating pyrotechnic elements which usually consist of a switch and control unit, ignition means and an ignition charge body. Said switch and control element is triggered by way of an electric coupling via a line in order to initiate ignition. The line for the electric coupling and the dimensions of the switch and control element which are usually accommodated in an IC housing complicate the design and the automatic assembly of the trigger units. According to the invention, the switch and control element (1) is surrounded by a first shell (2). Said first shell (2) is connected to a second shell (1) which contains the ignition charge body (23). The invention is further characterized in that the ignition means (19) dip into said second shell (21).

17 Claims, 4 Drawing Sheets

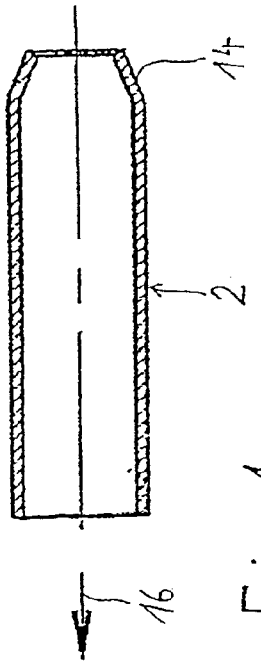
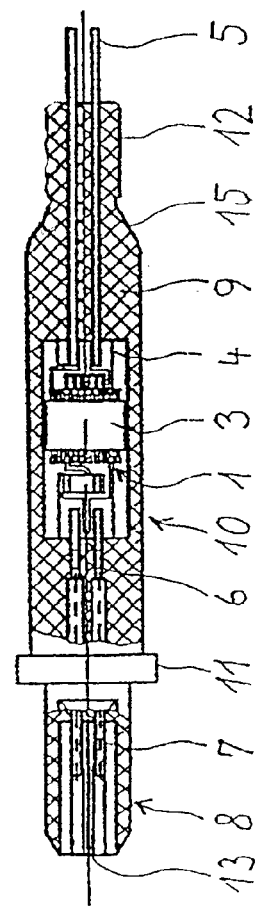
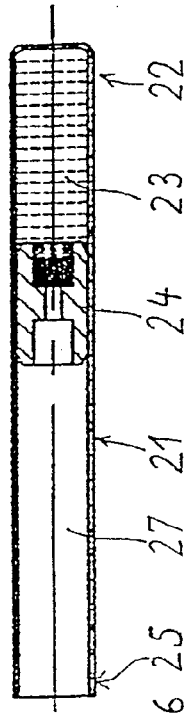
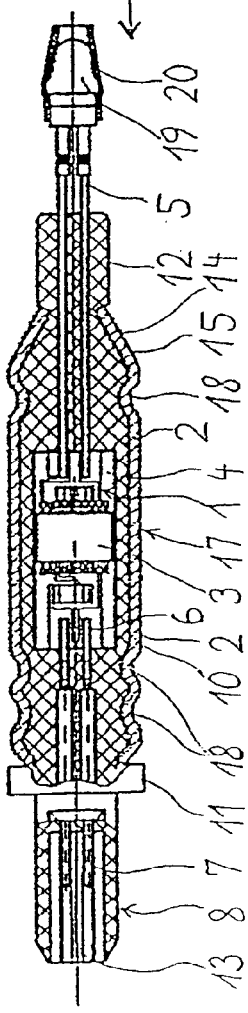
Fig. 1
Fig. 2
Fig. 3

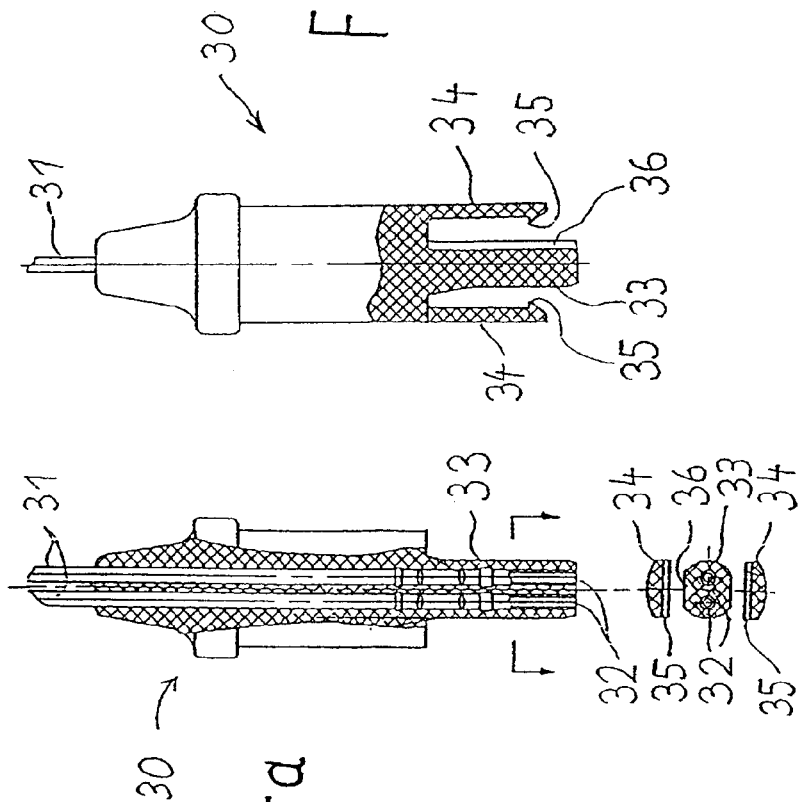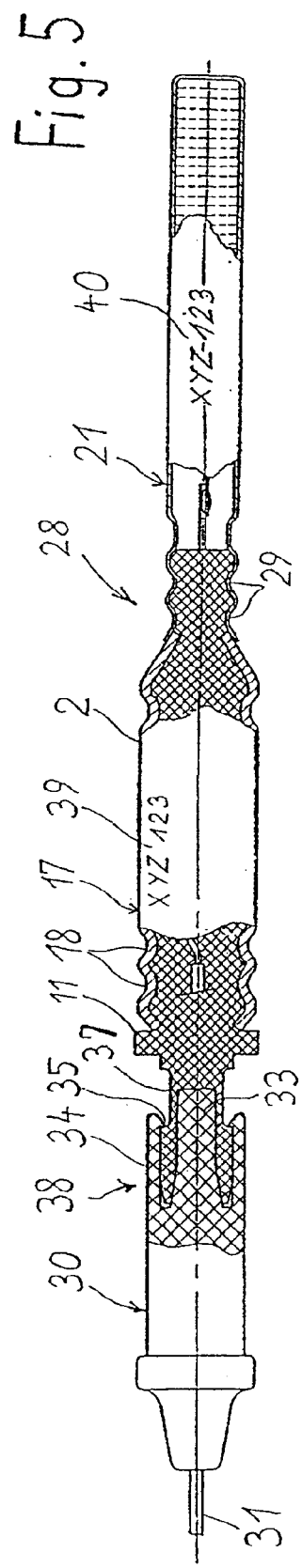

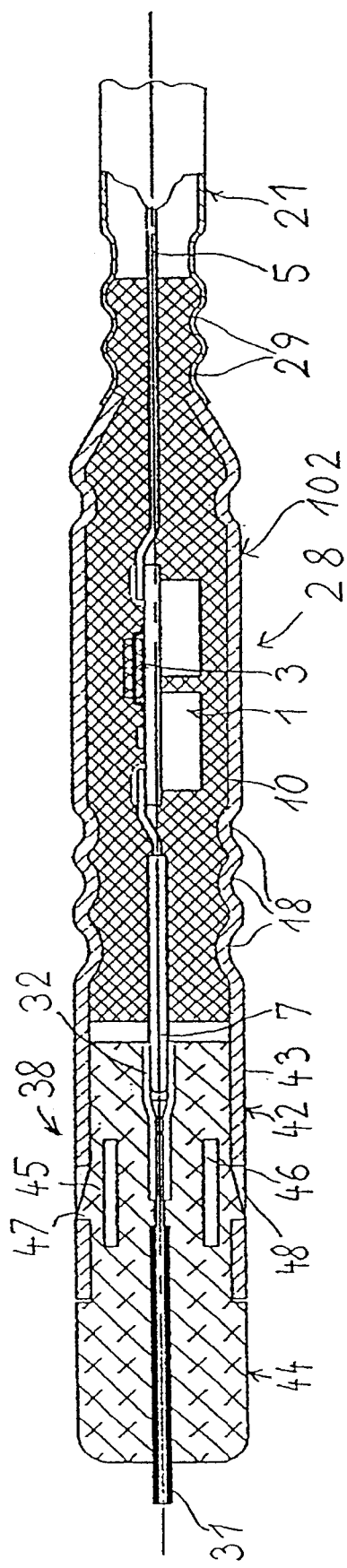
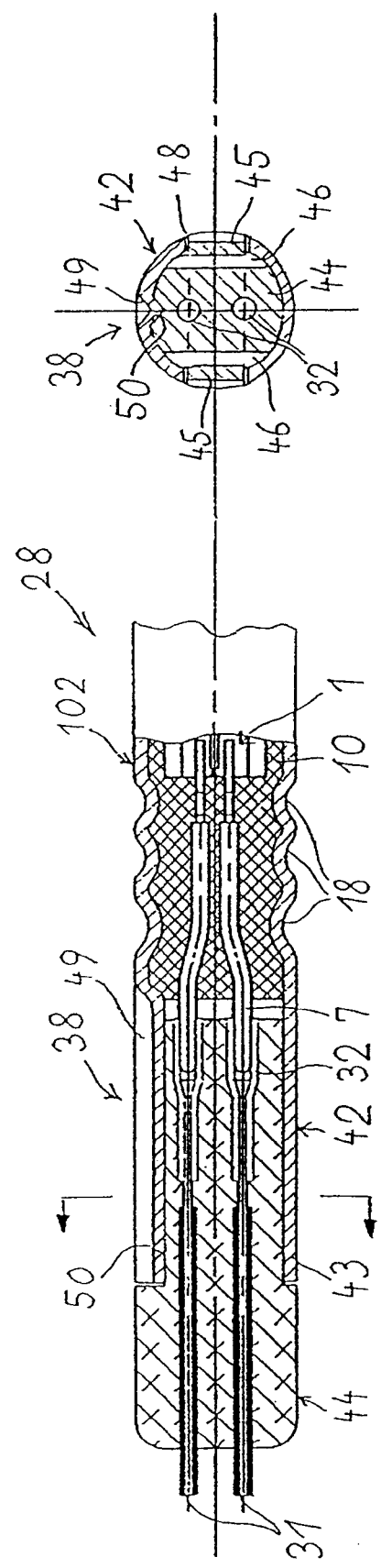
Fig. 6a
Fig. 6b
Fig. 6c

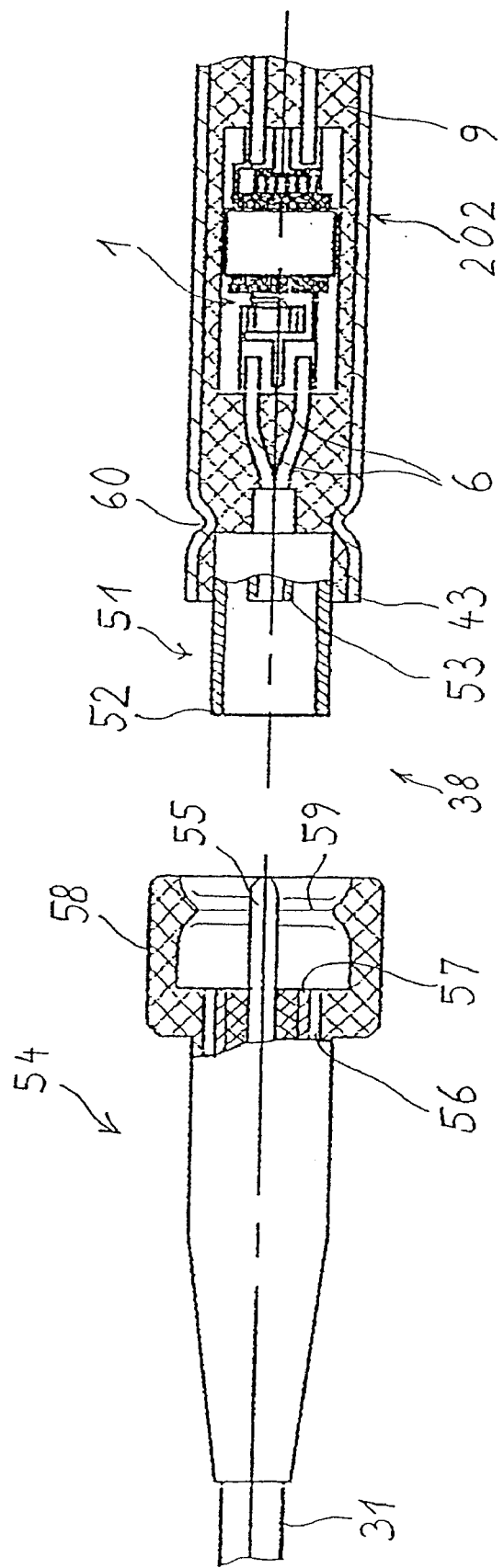

TWO-PIECE CAPSULE TRIGGER UNIT FOR INITIATING PYROTECHNIC ELEMENTS

BACKGROUND OF THE INVENTION

The invention relates to a trigger unit for initiating pyrotechnic elements.

By pyrotechnic elements are to be understood all elements which, as a result of the application of a electric voltage, preferably in correction with coded signals, trigger a pyrotechnic effect that has a desired result, for example the ignition of an explosive charge or the triggering of the gas generator of an air bag or belt tightener. Thus, inter alia fuses, in particular detonating fuses for civil and high-security domains (automotive, military and oil-field domains), ignition elements and gas generators belong to the pyrotechnic elements.

Electronic fuses whose ignition lines have commercially available plugs, for example DIN plugs, jack plugs, RCA plugs or BNC plugs, with which the electrical connection to the terminal lines of other fuses and the detonating machine is established, are known from EP 0 849 562 A2. These known electronic fuses each have an ignition line of a specific length which end initially in, for example, a jack plug. Emerging from this plug there is a further line (bus line) which ends in a plug socket that is compatible with the jack plug. The plug and plug socket of a fuse are wired in such a way that the individual poles are short-circuited when the former are plugged together. The fuses are delivered with plugs plugged into the socket. This is to provide protection against unintentional ignition, in particular in the case of an external voltage effect and high-frequency loading Before the fuse is assembled, the ignition line with the plugs connected thereto must be soldered onto the electronic circuit of the fuse.

Electric fuses in which the wires of the ignition line are embedded, in a twisted state, in the stopper sealing the housing of the fuse are known from DE-OS 28 24 568. A specific length of the ignition line is assigned to the fuse. If required, the components of a plug connection can be connected to this ignition line. Fuses equipped in such a way have the disadvantage that the ignition line attached thereto takes up more space and is heavier than the fuse itself.

Moreover, an ignition line that is already connected to the ignition means, for example an ignition cap, or to the hybrid containing the electronic components complicates the assembly of the fuses Before assembly of the known fuses, the ignition line must be soldered or welded onto the hybrid or the ignition cap. The ignition line that is coiled and which is substantially large in terms of volume and mass, hangs from these small dimensioned parts, on the flexurally slack wires, whereby manual assembly of the components of the fuses is complicated and mechanical assembly becomes expensive and has long cycle times.

SUMMARY OF THE INVENTION

It is therefore the object of the present invention to purpose a trigger unit for initiating pyrotechnic elements that can be produced in a rational manner.

The object is achieved by surrounding the switch and the control unit by a first housing case, the first housing case being connected to a second housing case which contains the charge body, and by having the ignition means go right into the second housing case.

Advantageous developments of the invention are claimed in the subclaims.

The trigger it in accordance with the invention for initiating pyrotechnic elements is composed of two housing cases. The first housing case surrounds a stitch and control unit, for example in the case of an unfinished or base fuse the so-called hybrid. The hybrid comprises inter alia the electronic circuit arrangements for addressing a fuse and, if applicable, for fixing the ignition point. Connected to this first housing case there is a second housing case which contain the charge body. This is, for example, in the case of a detonating fuse, the detonating capsule that is charged with the initiating detonating agent or, in the case of a belt tightener, the propellent charge for the generation of gas. Going right into this second housing case is the ignition means that is connected to the switch and control unit and which is not surrounded by the first housing case. The switch and control unit can consist of a printed circuit board on which sensitive electronic components are arranged. Owing to the fact that the switch and control unit is surrounded, in accordance with the invention, by a stable housing case, it can even be handled by automatic handling and loading machines for the mechanical assembly of a trigger unit without the electronic components being endangered. Moreover, storage and further processing are simple and inexpensive on account of the compact form.

Since the switch and control unit is surrounded by its own housing case, in view of the diameter of this housing case it is not necessary to pay any heed to the diameter of the housing case for the charge body. This is advantageous, for example, if the switch and control unit is accommodated in an IC package or, for example, bulky capacitors are used whose dimensions exceed the diameter of the housing case of the charge body. In this case, the diameter of the housing case for the switch and control unit can be greater than the diameter of the housing case for the charge body.

Owing to the fact that the charge body and the switch and control unit are arranged separately from each other in their own respective housing cases, it is possible, moreover, to surround the switch and control unit with a housing case that has a substantially greater wall thickness than the housing case of the charge body, for example the detonating capsule of a fuse. As a result of this equipping, the sensitive electronic components of the switch and control unit are not only protected against damage during handling, in the case of mechanical assembly, but also against the influences to which the trigger units are subject during their use. For example in the case of detonating fuses, in particular if, in the case of blasting at time intervals by detonating fuses, great dynamic pressure, shock and/or impact loads are exerted on the not yet ignited fuses, the so-called hybrid, the switch and control unit for fuse-addressing and for fixing the ignition point, is protected from these effects of pressure and impact on account of the greater wall thickness of the housing case before there is premature failure. The wall thickness and, in particular, the material of the housing case can be matched to the respective case of loading. So that an electronic fuse is optimumly protected against the effects of preceding fuse explosions, in particular with blasting at intervals, it is possible to avoid damage to the hybrid on account of pressure and shock effects in the beat possible way by means of the choice of the materials, for example steel, brass or copper. In order to be able to withstand the effects of the pressure in an optimum manner, in particular when there is blasting at intervals, the first housing case should withstand a dynamic pressure load of at least 100 MPa without deformation. Separate protection measures as used in the case of known fuses, for example the fitting of reinforcing or protecting tubes over the sensitive portion of the electronics unit, are superfluous.

In a further advantageous development of the invention, the switch and control unit is to be embedded in the first housing case in a hardened, non-metallic material. This can be effected in a preceding separate step of manufacture or, if the switch and control unit has been inserted into the first housing case, it is possible, for example, for plastics material, preferably polyvinyl chloride (PVC), polyurethane (PU) or else polyamides (PA), to be injection-moulded around it. Encapsulation, preferably with epoxy resins, is likewise possible. As a result of the injection-moulding or encapsulation, the switch and control unit is not just fixed in its position. The first housing case, as a result of being completely filled with the corresponding material, attains additional elastic rigidity against external pressure and shock effects.

The terminal contacts of the Switch and control unit are brought out of the first housing case at its two ends so that the electrical coupling for ignition is possible by way of a terminal to the ignition line, for example by means of a plug and plug socket, and to the ignition means, for example an ignition cap.

In a further advantageous development of the invention, the material that surrounds the switch and control unit can project from the first housing case in the form of a stopper at least on the side that faces the charge body, for example, a detonating capsule. This stopper is to be formed in such a way that it cam be inserted into the second housing case as a sealing and fastening element. In the case of mechanical assembly of the trigger unit, for example an electronic fuse, the first housing case with the stopper can be inserted into the second housing case with the charge body, for example a detonating capsule that is charged with initiating explosive. Then a connection can be established between the first and the second housing case, for example by adhering the stopper to the second housing case or by means of a form-locking connection by mechanical deformation of the second housing case, for example by swagging, camming action or crimping. The stopper, which, whilst projecting out of the first housing case, extends into the second housing case, assists the connection of the two housing cases and provides the connecting point with appropriate mechanical rigidity. Furthermore, it can be used to seal the second housing case, in particular, in a moisture-proof manner.

The first and the second housing case can be connected together in a form-locking, force-locking or substance-locking manner, in which case the mature of the connection depends upon the materials of the two housing cases, the loading that is to be expected during their use and also the handling when the two housing cases are brought together during assembly.

Instead of soldering the line for electrical coupling, for example an ignition line, directly onto the terminals of the switch and control unit that project out of the first housing case, the first housing case can also carry at its free end the coupling portion of a plug connection between the trigger unit and the line for the electrical coupling, the ignition line. As a result, the trigger unit no longer supports any line that is fixedly connected to it. A base fuse, for example, is, as a result, very compact in terms of its dimensions and can be equipped mechanically in a particularly advantageous manner, can be connected to the second housing case, to the detonating capsule, and subsequently can be packed.

Those materials, in particular, with which injection-moulding or casting around the switch and control unit in the first housing case is effected are suitable as the material for the coupling portion. The material, with which the first housing case is filled, can then assume the form of a plug socket or a plug at the free end of the housing case. When securing the coupling portion to the trigger unit, seceding of that coupling portion with which the line for electrical coupling, the ignition line, must be equipped, automatically follows.

Instead of moulding a coupling portion of a plug connection from the material in which the switch and control unit is embedded, it is also possible in the case of a fuse the detonating capsule to form the first housing case as a coupling portion at its end that is remote from the charge body. Thus, for example, the housing case can project beyond the cylindrical body with the switch and control unit that fills the housing case and can form a plug socket. In order to fix the plug of the line, it is possible to provide openings in the housing case wall into which spurs an the plug engage. In addition, other known elements that secure the plug connection can be provided. The advantage of this plug connection is the high level of stability and the protection against bending and in particular against kinking during the use of the trigger unit, in particular the fuse.

In a further development of the invention the coupling portions of the plug connection are each equipped with an orientation aid so that connection of the coupling portions is possible in just one orientation. As a result, when connecting the line to the electrical coupling, wrong connection are to be prevented from being established that could lead to the disturbance, failure or even to the unintentional self-ignition of the trigger unit. The orientation aids can be plug chicanes, for example. These are inter alia irregular cross sections of the plug and plug socket so that insertion is only possible in one orientation. In addition, the arrangement of the terminals can be used to form an orientation. If the plug and plug socket have a symmetrical cross section, the terminal pins or contact sleeves can, for example, be arranged in one diagonal in such a way that they are distributed across the respective cross section of the coupling portion or in such a pattern that even here it is only possible to couple the two coupling portions, plug and plug socket, in one orientation.

Further advantages emerge if the coupling portions of the trigger unit and the line for the electrical coupling are equipped with interlocking locking elements that establish a connection that is secured against being broken unintentionally. The locking elements, for example claws of so-called stop lamellae that engage into a groove, or a web ring that latches into the groove, a cap nut on the plug which is screwed together with the plug socket, or a bayonet catch, secure the two coupling portions, plug socket and plug, against being drawn apart unintentionally and thus undoing the connection. The plug connections of the fuses that are provided for rugged conditions in mines, quarries and in explorations, for example, are to be able to tolerate high tensile forces, as far as possible above 100 N, without the plug connection coming undone or the plug connection becoming loose.

In a further advantageous development of the invention, the coupling portions of the plug connection are equipped with sealing elements. Thus, for example, the contacts of the plug can be surrounded with a sealing ferrule which is accommodated and enclosed by the plug socket. The sealing ferrule is additionally covered by stop lamellae, the claws of which latch into a groove is of the plug socket. As a result of the plug connection that has been described, the contacts are protected against atmospheric influences, in particular against moisture, this being necessary, for example, for the use of detonating fuses in quarries, in mining and in explorations. The plug and plug socket can, for example, also be protected against the penetration of moisture by way of interconnected sealing rings.

In a further development of the invention, the number of contacts of the plug or the plug socket as well as their arrangement is matched to the use of the trigger unit. As a rule, two contacts suffice, although, for example in the case of detonating fuses, it can be necessary to provide more than two contacts, in a maser conditional on a special sequence of detonations or the arrangement of the fuses. Furthermore, the arrangement of the contacts can contribute to raking impossible a wrong connection of a plug or a plug socket.

The electronic control of the trigger unit, for example the setting of the ignition point of detonating fuses in the case of explosions at time intervals, is effected by means of semiconductor integrated circuits, with their modules being accommodated in an IC package in a further development of the invention. On account of the compact construction and the secure accommodation in the package it is possible to test the terminals of the IC by means of testing processes with a fuse function. IC-packages can easily be processed on prefabricated printed circuit boards on account of the terminals that are directed out in a defined manner. The use of encapsulated, prefabricated integrated circuits provides the advantage that these circuits are already tested at the site of their manufacture in all the temperature ranges in which use is possible so that no trigger needs to be singled out on account of a defective switch and control unit only after a trigger unit has been assembled. Whether for detonating fuses, belt tighteners or gas generators for air bags, the electronics unit may not have any defects. It is therefore more cost-effective to reject just the defective electronics unit (IC package) than it is to reject a complete trigger unit Moreover, the circuits that are accommodated in an IC package present special advantages in the case of automatic handling during the fitting of the printed circuit boards in chip on board technology on account of the high assembly) demands on the product.

In a further advantageous development of the invention at least the first housing case of the trigger unit has an identifying marking. The identifying marking can, for example, consist of a legible inscription or even of a bar code. It can contain the data that is relevant to the use of the trigger unit, for example the manufacturer, the type designation, the legal identification marking and, in the case of fuses, in addition, the time stage or the ID number.

The identifying marking does not need to be limited to the first housing case. It can also be applied to the second housing case. With separate manufacture of a switch and control unit, a base fuse, for example, and the charge body, for example a detonating capsule, when later brought together to form a trigger unit, an electronic fuse can result on account of the identifying marking on the two housing cases non-interchangeable association of the portions which can be assembled together.

The invention is explained in greater detail with reference to detonating fuses as an exemplifying embodiment. On account of the different structural forms of other trigger units, for example belt tighteners or gas generators of air bags, the embodiments can differ from one another.

BRIEF DESCRIPTION OF THE DRAWINGS

In the drawings:

FIG. 1 shows, in section, the hybrid of a detonating fuse before installation in the first housing case;

FIG. 2 shows, in section, the finished assembled base fuse of a detonating fuse before assembly with the detonating capsule;

FIG. 3 shows, partly in section, the finished electronic detonating fuse with ignition line connected thereto;

FIG. 4a shows, in section, the coupling portion of the ignition line, the plug, in the plane of the contacts;

FIG. 4b shows the coupling portion according to FIG. 4a in cross section at the point specified;

FIG. 4c shows the coupling portion according to FIGS. 4a and 4b in a view that is turned through 90°;

FIG. 5 shows, partly in section, an electronic fuse with an ignition line, connected by way of a plug connection, and codings on the base fuse and detonating capsule;

FIG. 6a shows, in a longitudinal section through the locking elements, a plug connection in which the fat housing case is formed as a plug socket;

FIG. 6b shows the same plug connection in a longitudinal section through the orientation aids;

FIG. 6c shows a cross section through the plug connection at the point specified in FIG. 6b; and FIG. 7 shows a longitudinal section through a cinch plug as a plug connection.

DETAILED DESCRIPTION OF THE PREFERRED EMBODIMENTS

The hybrid 1, the switch and control unit, of an electronic fuse that is ready for installation in a first housing case 2 is shown in FIG. 1 the hybrid 1 comprises inter alia the electronic components which are required for addressing the fuse and, if applicable, for fixing the ignition point. These electronic components are enclosed by an IC package 3 which is soldered onto a printed circuit board 4. The terminals 5 of the ignition means, in the present exemplifying embodiment an ignition cap, and also the terminals 6 of the contact pins 7 of a plug socket 8 are fitted onto this printed circuit board 4. The ignition line is connected to a plug by way of this plug socket 8.

The hybrid 1 and also the terminals are embedded in a hardened, non-metallic material 9. The material can, for example, be a plastics material or casting resin. A cylindrical body 10 is formed that surrounds the hybrid 1 and also the terminals. In the assembled state according to FIG. 2, the housing case 2 extends as far as the collar 11. The plug socket 8 is formed from the portion that projects out of the first housing case 2. It extends as far as the collar 11 which seals the housing case 2. A stopper 12 projects out of the housing case 2. This stopper 12 is used as a sealing and fastening element in the second housing case.

An orientation aid 13 is visible on the inner wall of the plug socket 8. It is a thickened portion with a triangular cross section that extends in the longitudinal direction of the contact pins 7 and which must engage into a correspondingly formed groove in the plug (FIGS. 4b and 4c). As a result, a plug-connection between the plug and plug socket is possible in only one orientation.

The first housing case 2 has a wall thickness that is greater than that of the second housing case, As a result, it is possible to protect the hybrid in particular from dynamic pressure loads, for example when used in the secondary ignition range. Moreover, the housing case is produced from a material which is resistant to load such as, for example, steel or brass. The first housing case 2 has a conical taper 14 at the end at which it is connected to the second housing case. It thereby forms a transition to the smaller diameter of the second housing case. Moreover, this conical taper 14 serves as a stop for the conical taper 15 of the cylindrical body 10 if, for example, in the case of mechanical assembly of the two components the housing case 2 is pushed over the cylindrical body 10 with the hybrid 1, as indicated by the arrow 16.

FIG. 2 shows the ready-assembled base fuse 17. The first housing case 2 has been pushed over the cylindrical body 10 with the hybrid 1. The cylindrical body 10 is fixed in the first housing case 2 in the present exemplifying embodiment by means of so-called crimping. In this connection, the material of the first housing case 2, is pressed concentrically at one or more adjacent points into the material 9 of the cylindrical body 10, as effected at the concentric annular constrictions below the collar 11 and above the conical taper 14 of the first housing case 2.

The plug socket a and the stopper 12 project the first housing case 2. The ignition cap 19 is soldered onto the terminal lines 5. It is encapsulated in a shrinkdown tube 20 which serves as protection in the came of electrostatic coupling.

The second housing case 21, the detonating capsule, is shown below the base fuse 17. In the region of its closed end 22 it contains the charge 23, the initiating detonating agent, and arranged above this the primary charge 24. It is slipped with its open end 25 in the direction of arrow 26 over the ignition cap 19 and onto the stopper 12. The ignition cap 19 thereby goes right into the empty region 27 of the second housing case 21.

The diameter d of the second housing case 21, as can be seen from the representation in FIG. 2, is smaller than the diameter D of the first housing case 2, because its diameter d does not need to be matched to the IC package of the hybrid. The wall thickness of the second housing case 21 is substantially less than the wall thickness of the first housing case 2, because it does not need to protect a sensitive electronics unit. The second housing case can be produced separately from the base fuse 17. This simplifies the production of an electronic fuse. The production of the base fuse is not only simplified in the absence of the explosive of the detonating capsule, but also becomes safer.

FIG. 3 shows a complete electronic fuse 28. The second housing case 21 has been slipped over the stopper 12 of the base fuse 17 and in the present exemplifying embodiment has been connected to the base fuse 17 by inward crimping, evident from the two concentric constrictions 29. The stopper 12 of the base fuse 17 thereby establishes the connection between the first housing case 2 and the second housing case 21.

FIGS. 4a to 4c show the plug 30 that is compatible with the plug socket 8, in two longitudinal sections that are perpendicular to each other, and also in one cross, section, with which plug connection of the ignition line 31 is made to the electronic fuse.

FIG. 4a shows a longitudinal section through the plug 30, with the section extending in the plane of the two terminal wires of the ignition line 31. The two wings end in two contact sleeves 32 for receiving the contact pins 7 of the plug socket S. The two contact sleeves 32 are embedded in a so-called sealing ferrule 33 which can be inserted into the plug socket 8.

A view of the section through the plug 30 in the region of the sealing ferrule 33 according to FIG. 4b Shows that a so-called stop lamella 34 is arranged above and below the sealing ferrule 33 with the contact sleeves 32, in addition, in each case. These stop lamellae 34 are elastic and they latch into the grooves 37 of the plug socket 8 (FIG. 5) by means of their claws 35 that are arranged at the ends when the sealing ferrule 33 has been inserted far enough into the plug socket 8.

A so-called orientation aid 36 can be seen on the sealing ferrule 33 in FIGS. 4b and 4c. It is a groove that is arranged on one side in the sealing ferrule 33 of the plug 30 and which renders possible insertion into the plug socket 8 in just one orientation, because the orientation aid 13 that is known from FIG. 1, an appropriately shaped thickened portion in the wall of the plug socket 8, must engage into this groove 36. A reliable connection between the ignition line 31 and the fuse 28 is only guaranteed after the plug 30 has been completely inserted into the plug socket 8 and the claws 35 have latched into the grooves 37.

FIG. 5 shows an electronic fuse 28 with ignition line 31 coupled thereto. As a result of inserting the plug 30 into the plug socket 8, a plug connection 38 will have been established. It can be seen from the sectional drawing that the sealing ferrule 33 has been completely inserted into the plug socket 8 and the claws 35 of the stop lamellae 34 have engaged into the grooves 37 of the plug socket 8. As a result, unintentional separation of the plug connection is precluded. The plug 30 can only be pulled out of the plug socket 8 if the lamellae 34 are bent so far outwards that the claws 35 are no longer engaged with the grooves 37.

The present exemplifying embodiment shows an electronic fuse, the terminal connection of which is formed as a plug socket. The subject of the invention is not changed if the coupling portions of the plug connection are interchanged, chat is, if the head portion of the electronic fuse in formed as the plug and the coupling portion of the fuse line is formed as the plug socket.

Furthermore, FIG. 5 shows a coding 39 on the periphery of the first housing case. Tis gives information, for example, on the associated time stage, the manufacturer and possibly which detonating capsules it is suitable for. The coding 40 on the second housing case 21, the detonating capsule, facilitates the association with a suitable base fuse 17.

A further exemplifying embodiment of a plug connection is shown on an enlarged scale in FIGS. 6a to 6c. Features that correspond with the previous exemplifying embodiment are denoted by the same reference numerals.

In FIG. 6a an electronic fuse 28 partly in section, there is shown, in which the first housing case 102 is formed as a plug socket 42. The section extends though the locking elements with which the plug 44 is secured in the plug socket 42 against being pulled out unintentionally.

In contrast to the previous exemplifying embodiment, the outer housing case extends beyond the cylindrical body 10, in which the hybrid 1 with the IC package 3 is embedded. The contact pins 7, to which the ignition line 31 is connected by means of the plug 44, project from the end face of the cylindrical body 10.

The ignition line 31 with the contact sleeves 32 connected thereto is embedded in the plug 44. As can be seen from FIG. 6c, the plug 44 has so-called stop lamellae 45 on opposing sides, each of which lamellae gives way on account of an undercut 46 when the plug 44 is inserted into the plug socket 42 in order then to latch with its spur 47 in a window 48 in the wall of the housing case. The plug 44 is thereby secured against being unintentionally pulled out of the plug socket 42. Since the plug socket 42 encompasses the plug 44 as far as and beyond the region of the contact sleeves 32, the plug connection 38 is secured in a particularly advantageous manner against bending stresses and kinking, this being advantageous in particular when used, for example, in quarries, mines or in the case of explorations.

FIG. 6b shows a section through the orientation aids on the plug and the plug socket, with which aids just one single orientation of the coupling portions is possible in order to establish a plug connection. The orientation aid on the plug socket 42 of the electronic fuse 28 is a V-shaped bead 49 in the wall of the first housing case 102. Associated with this bead 49 in the plug 44 as an orientation aid is a V-shaped groove 50. This can be seen particularly clearly in FIG. 6c which shows a cross section through the plug connection 38 at the point specified in FIG. 6b. The plug and plug socket can only be plugged into each other if the bead 49 of the plug socket 42 is opposite the groove 50 of the plug 44. Interchanging the terminals of the ignition line 31 is thereby precluded.

FIG. 7 shows an exemplifying embodiment of a plug connection 38 with an encapsulated cinch plug Such a plug connection has the advantage that no measures need to be taken for position-orientated insertion of the plug into the socket, this substantially simplifying the assembly. The hybrid 1, which is embedded in a hardened, non-metallic material 9, is connected, in the present exemplifying embodiment, by way of terminals 6 to a plug socket 51. This plug socket 51 consists of two concentric contacts 52 and 53 in the form of sheet-metal cylinders which project out of the free end 43 of the first housing case 202.

The plug 54 on the ignition line 31 preferably consists of an elastic plastics material and contains the contact pin 55, which can be inserted into the inner contact 53 of the plug socket 51, and the contact sleeve 57, which is surrounded by a concentric gap 56, for contacting the outer terminal 52.

The contacts are additionally protected against moisture by a cap 58 which is sipped over the housing case 202. In this connection, a wedge-shaped bulging portion 59 engages into a bead 60 in the housing case 202 and thus forms a form-locking means of securing and sealing the plug connection 38.

What is claimed is:

1. Trigger unit for initiating pyrotechnic elements, comprising a switch and control unit, and ignition means and a charge body, with the switch and control unit being ignited by means of an electrical coupling by way of a line, characterized in that the switch and control unit is surrounded by a first housing case, in that this first housing case is connected to a second housing case which contains the charge body, and in that the ignition means goes right into this second housing case so as to be surrounded by the second housing case but not the first housing case.

2. Trigger unit according to claim 1, characterized in that the diameter of the first housing case, surrounding the switch and control unit is larger than the diameter of the second housing case containing the charge body.

3. Trigger unit according to claim 1, characterized in that the first housing case has a greater wall thickness than the second housing case.

4. Trigger unit according to claim 1, characterized in that the first housing case consists of a material which differs from the material of the second housing case.

5. Trigger unit according to claim 1, characterized in that the first housing case withstands a dynamic pressure load of at least 100 MPa without deformation.

6. Trigger unit according to claim 1, characterized in that the switch and control unit in the first housing case is embedded in a hardened, non-metallic material.

7. Trigger unit according to claim 1, characterized in that the material that surrounds the switch and control unit projects out of the first housing case in the form of a stopper at least on the side that faces the second housing casing, and in that this stopper can be inserted into the second housing case as a sealing and fastening element.

8. Trigger unit according to claim 1, characterized in that, at its end that is remote from the second housing case, the first housing case carries the coupling portion of a plug connection between the trigger unit and the line that establishes the electrical coupling.

9. Trigger unit according to claim 8, characterized in that the coupling portion is formed from the material which surrounds the switch and control unit.

10. Trigger unit for initiating pyrotechnic elements, comprising a switch and control unit, an ignition means and a charge body, with the switch and control unit being ignited by means of an electrical coupling by way of a line, characterized in that the switch and control unit is surrounded by a first housing case is connected to a second housing case which contains the charge body, in that the ignition means goes right into this second housing case, in that, at its end that is remote from the second housing case, the first housing case carries the coupling portion of a plug connection between the trigger unit and the line that establishes the electrical coupling in that the free end of the first housing case is formed as a plug socket or contains a plug socket.

11. Trigger unit according to claim 8, characterized in that the coupling portions of the plug connection are equipped with an orientation aid so that connection of the two coupling portions is possible in just one orientation.

12. Trigger unit according to claim 8, characterized in that the coupling portions of the trigger unit and the line are equipped with interlocking locking elements which establish a connection that is secured against being undone unintentionally.

13. Trigger unit according to claim 8, characterized in that at least one coupling portion of the plug connection is equipped with a sealing element.

14. Trigger unit according to claim 8, characterized in that the number of contacts of the plug and the number of contacts of the plug socket are matched to the use of the trigger unit.

15. Trigger unit according to claim 1, characterized in that integrated circuits are provided in an IC package for addressing and controlling the trigger unit.

16. Trigger unit according to claim 1, characterized in that at least the first housing case has an identifying marking from which data that is relevant to the use of the trigger unit can be read off.

17. Trigger unit according to claim 16, characterized in that the second housing case likewise bears an identifying marking, and in that it is possible to associate a suitable switch and control unit with a charge body with the aid of the identifying marking of the first housing case and the identifying marking of the second housing case.

* * * * *